US008157649B2

(12) United States Patent
Seelig et al.

(10) Patent No.: US 8,157,649 B2

(45) Date of Patent: Apr. 17, 2012

(54) GAMING APPARATUS HAVING ONE OR MORE ORGANIC LIGHT EMITTING DIODE DISPLAY DEVICES AND A ROLLER

(75) Inventors: Jerald C. Seelig, Absecon, NJ (US); Lawrence M. Henshaw, Hammonton, NJ (US)

(73) Assignee: Atlantic City Coin & Slot Service Company, Inc., Pleasantville, NJ (US)

( * ) Notice: Subject to any disclaimer, the term of this patent is extended or adjusted under 35 U.S.C. 154(b) by 905 days.

(21) Appl. No.: 11/847,066

(22) Filed: Aug. 29, 2007

(65) Prior Publication Data

US 2008/0058051 A1 Mar. 6, 2008

Related U.S. Application Data

(60) Provisional application No. 60/824,056, filed on Aug. 30, 2006.

(51) Int. Cl.

*G06F 17/00* (2006.01)
*G06F 19/00* (2011.01)
*A63F 9/24* (2006.01)
*A63F 13/00* (2006.01)

(52) U.S. Cl. ................. 463/31; 463/16; 463/20; 463/30

(58) Field of Classification Search .............. 463/16–20, 463/30–32

See application file for complete search history.

(56) References Cited

U.S. PATENT DOCUMENTS

| | | | | |
|---|---|---|---|---|
| 5,788,573 | A | 8/1998 | Baerlocher et al. | |
| 5,848,932 | A | 12/1998 | Adams | |
| 6,309,300 | B1 | 10/2001 | Glavich | |
| 6,336,863 | B1 | 1/2002 | Baerlocher et al. | |
| 6,439,995 | B1 | 8/2002 | Hughs-Baird et al. | |
| 7,452,276 | B2 * | 11/2008 | Loose et al. | 463/31 |
| 7,682,249 | B2 * | 3/2010 | Winans et al. | 463/31 |
| 2002/0173354 | A1 * | 11/2002 | Winans et al. | 463/20 |
| 2004/0180716 | A1 * | 9/2004 | Seelig et al. | 463/20 |
| 2004/0266515 | A1 | 12/2004 | Gauselmann | |
| 2004/0266518 | A1 * | 12/2004 | Gauselmann | 463/20 |
| 2006/0014580 | A1 * | 1/2006 | Hawthorn | 463/20 |
| 2006/0281529 | A1 * | 12/2006 | Seelig et al. | 463/20 |
| 2006/0281530 | A1 * | 12/2006 | Seelig et al. | 463/20 |
| 2007/0010318 | A1 * | 1/2007 | Rigsby et al. | 463/20 |
| 2007/0077984 | A1 * | 4/2007 | Aida et al. | 463/20 |
| 2008/0153577 | A1 * | 6/2008 | Seelig et al. | 463/20 |
| 2009/0093301 | A1 * | 4/2009 | Sum | 463/31 |

* cited by examiner

*Primary Examiner* — Milap Shah

(74) *Attorney, Agent, or Firm* — Ian F. Burns & Associates, P.C.

(57) ABSTRACT

A gaming apparatus includes a display device that has a several display surfaces that are visible to a game player. The display surfaces are formed by one or more organic light emitting diode displays. A controller is in communication with the display device and can display at least one game outcome.

10 Claims, 7 Drawing Sheets

GAMING APPARATUS HAVING ONE OR MORE ORGANIC LIGHT EMITTING DIODE DISPLAY DEVICES AND A ROLLER

CROSS REFERENCES TO CO-PENDING AND RELATED APPLICATIONS

This application claims priority to U.S. provisional patent application Ser. No. 60/824,056, filed Aug. 30, 2006, and entitled "Video Gaming Display and Method", the contents of which are herein incorporated by reference in entirety.

FIELD OF THE INVENTION

The present invention relates to gaming devices and, more particularly, to a gaming device having an organic light emitting diode display that can be formed into various shapes.

BACKGROUND

Gaming devices are well known in the art and a large variety of gaming devices have been developed. In general, gaming devices allow users or players to play a game. In many casino-type gaming devices, the outcome of the game depends, at least in part, on a randomly generated event. For example, a gaming device may use a random number generator to generate a random or pseudo-random number (hereinafter, both types are referred to as a "random number").

The random number can be used to determine a game outcome. For example, the random number may then be compared to a predefined table to determine a corresponding outcome of the event. If the random number falls within a certain range of numbers on the table, the player may win the corresponding predefined prize. The table may also contain display information that allows the gaming device to generate a display that corresponds to the outcome of the game. The gaming device may present the outcome of the game on a large variety of display devices, such as mechanical spinning reels or video screens.

Some gaming devices award bonus prizes in addition to prizes that are awarded in a primary game. Of course, the prize in the primary game may simply be the opportunity to play the bonus game. A bonus prize is generally defined as a prize in addition to the prize obtained from the primary game and that is awarded to the player when a predefined event occurs. An example of a bonus game can be found in U.S. Pat. No. 5,848,932 to Adams. Adams discloses a primary game having three spinning game reels and a bonus game having a bonus display with one spinning wheel. The spinning wheel is divided into multiple sections, and each section has a symbol representing a prize. When predetermined indicia are displayed on the spinning game reels of the primary game, the wheel of the bonus display spins and stops. The bonus prize is displayed as the symbol on the wheel being pointed to by a pointer. The bonus prize is awarded in addition to any prizes awarded in the primary game. Another bonus game is disclosed in Baerlocher et al. (U.S. Pat. No. 6,336,863). Baerlocher et al. discloses a slot machine with a bonus award display. The bonus award display has a bonus wheel and a mechanical, movable pointer.

One of the problems associated with the devices disclosed in these references is that the outcome of the bonus game is communicated to the player almost immediately. When a bonus game is triggered, a bonus award is selected, displayed, and awarded to the player. The player can see what the outcome of the game is immediately after the pointers have stopped moving. What has long been needed is a device that utilizes intermediate steps between the occurrence of the bonus event and the awarding of the bonus prize to add an additional element of anticipation and excitement for the players. It is further desired that the intermediate steps involve an eye-catching display. Another problem associated with Adams and Baerlocher et al. is that they utilize a plain combination of wheel and pointer. The applicants have discovered more things that can be done to display devices to make them more attractive and interesting to play.

Generally, bonus prizes are awarded in order to increase the excitement and enjoyment experienced by players, which attracts more players to the game and encourages players to play longer. When this occurs, the gaming devices tend to be more commercially successful relative to other gaming devices. A shortcoming of present bonus games is that they do not sufficiently allow players to interact with the gaming device, including during bonus games.

Other attempts have been made to provide player interaction. U.S. Pat. No. 5,788,573 to Baerlocher et al. (hereinafter, "Baerlocher") purports to suggest a gaming device with an electronic "wheel of fortune game." Several flippers appear to indicate positions on the wheel. Baerlocher appears to suggest that the player may be allowed to choose which flipper is used to select an indicium on the wheel. However, the player does not appear to have any control over the position of the flipper and the flippers do not appear to be capable of moving to different positions.

U.S. Pat. No. 6,309,300 to Glavich (hereinafter, "Glavich") and U.S. Pat. No. 6,439,995 to Hughs-Baird et al. (hereinafter, "Hughs-Baird") purport to suggest a gaming system having a bonus feature where a player may be allowed to select a number of selectable items, which may be prize representations, on a video display. Glavich and Hughs-Baird do not appear to suggest using prize indicators, moveable prize indicators, or allowing a player to position a prize indicator. While a large number of gaming devices have been developed, it is desired to develop new gaming devices that will attract game player interest, resulting in longer game play times and, consequently, increased revenue for casino operators.

SUMMARY

Advantages

The various embodiments of the present invention may, but do not necessarily, achieve one or more of the following advantages:

provide a highly attractive and entertaining device for conducting games;

provide a highly attractive and entertaining device for displaying prizes;

the ability to attract more patrons to play a game;

the ability to encourage players to play longer on a gaming apparatus;

provide a unique display that has several display surfaces;

provide a display that uses an organic light-emitting diode display;

allow players to control the movement of a prize indicator;

provide a video type display that is bent into a variety of shapes; and provide a display that allows for a relatively larger number of indicia to be displayed.

These and other advantages may be realized by reference to the remaining portions of the specification, claims, and abstract.

BRIEF DESCRIPTION OF CERTAIN ASPECTS OF THE INVENTION

In one embodiment, the present invention comprises a gaming apparatus that includes a display device that has several display surfaces that are visible to a game player. The display surfaces are formed by one or more organic light-emitting diode displays. A controller is in communication with the display device and can display at least one game outcome.

In another embodiment, the present invention comprises a gaming method that includes determining a game outcome and activating an organic light emitting diode display. Several indicia are displayed on the organic light emitting diode display. At least one of the indicia is indicated as the game outcome.

The above description sets forth, rather broadly, the more important features of the present invention so that the detailed description of the preferred embodiment that follows may be better understood, and contributions of the present invention to the art may be better appreciated. There are, of course, additional features of the invention that will be described below and will form the subject matter of claims. In this respect, before explaining at least one preferred embodiment of the invention in detail, it is to be understood that the invention is not limited in its application to the details of the construction and to the arrangement of the components set forth in the following description or as illustrated in the drawings. The invention is capable of other embodiments and of being practiced and carried out in various ways. Also, it is to be understood that the phraseology and terminology employed herein are for the purpose of description and should not be regarded as limiting.

BRIEF DESCRIPTION OF THE DRAWINGS

Certain embodiments of the invention are shown in the accompanying drawings wherein.

DESCRIPTION OF AT LEAST ONE EMBODIMENT OF THE PRESENT INVENTION

In the following detailed description of at least one embodiment of the present invention, reference is made to the accompanying drawings, which form a part of this application. The drawings show, by way of illustration, specific embodiments in which the invention may be practiced. It is to be understood that other embodiments may be utilized and structural changes may be made without departing from the scope of the present invention.

Figure 1A:
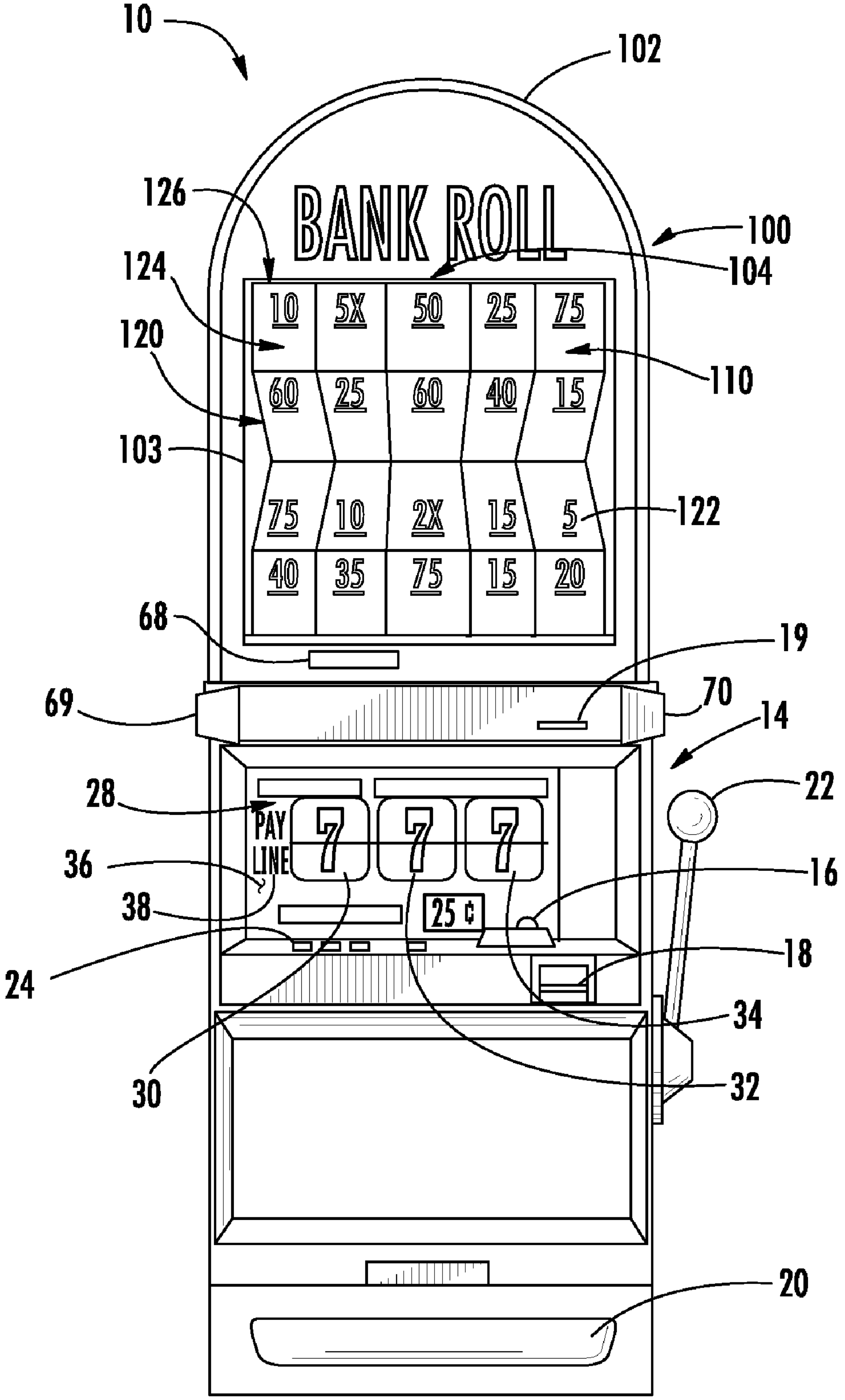
FIG. 1*a* is substantially a front elevation view of an embodiment of the gaming apparatus of the present invention.

As seen in FIG. 1*a*, the present invention comprises a gaming apparatus, generally indicated by reference number 10. In at least one embodiment, gaming apparatus 10 comprises a second display 100 and a primary gaming device 14. Gaming device 14 may be any of a large number of devices that are adapted to allow players to play a game, such as gaming devices typically found in arcade and casino environments, including arcade games, video games, gambling machines, video poker machines, slot machines, etc. In at least one embodiment, gaming device 14 is further adapted to allow a player to place a wager and play a game, such as a slot machine.

Gaming device 14 may include a value or wager acceptor for accepting value (including currency and/or currency equivalents), such as a coin slot 16, a card reader 18, or a voucher reader 19. In addition, a payout mechanism (not shown) and a coin receptacle 20 may be provided for awarding prizes or for dispensing value to players cashing out and retiring from a game. A printer (not shown) may also be provided for printing out cashless vouchers (not shown). A handle 22 and a player input device 24 may be provided for activating gaming device 14 to begin a game. A pay table (not shown) may further be provided to allow a player to see what symbol or combination of symbols provide a winning event. In at least one preferred embodiment, gaming device 14 may be a S2000 or S Plus model gaming device manufactured by International Game Technology in Reno, Nev.

Gaming device 14 may further include a gaming outcome display 28 that may be positioned in front of the gaming device 14 so that a player (not shown) playing gaming device 14 can see gaming outcome display 28. Gaming outcome display 28 may utilize physical game reels 30, 32, and 34. Game reels 30, 32, and 34 may be attached to a drive mechanism (not shown) of gaming device 14 to rotate the reels in a manner well known in the art. Each game reel 30, 32, and 34 may have a plurality of symbols positioned on the circumference of each game reel 30, 32, and 34. Game reels 30, 32, and 34 may be positioned side-by-side with coincident axes of rotation, and a portion of their individual circumferences may face outward from gaming device 14.

A panel 36 may cover game reels 30, 32, and 34 such that only a portion of their individual circumferences are shown to the player. At least one symbol from any of game reels 30, 32, and 34 may be used to display a game outcome. At least one pay line 38 may be provided for the player to use in determining a game outcome based on the symbol or a combination of symbols positioned thereon. In an alternative embodiment, gaming outcome display 28 utilizes a video display 55 (FIG. 1*b*) displaying images of game reels and an image of at least one pay line. A video display 55 may also display game symbols in many other formats and arrangements, such as playing cards. Of course, the invention is not limited to any particular type of gaming outcome display 28. Those of skill in the art will recognize that many different types of gaming outcome displays could be substituted without departing from the scope of the present invention.

Gaming apparatus 10 may include a second display 100 configured to display at least one game and prize to a player. In at least one embodiment, second display 100 is configured to display a bonus game and at least one bonus prize to the player. In other embodiments, second display 100 may provide a primary game. Alternatively, second display 100 may be a stand-alone device allowing a player to place a wager and play a game. Second display 100 can include a bonus meter display 68.

In at least one embodiment, second display 100 is attached to gaming device 14 and positioned on top of gaming device 14. In other embodiments (not shown), second display 100 may be separate from gaming device 14 but in communication with gaming device 14. In this embodiment, second display 100 may be in communication with a plurality of different gaming devices 14 via a computer network in a manner that is well known in the art. Second display 100 may also be positioned adjacent to or remote from gaming device 14. In other embodiments, second display 100 is a stand-alone display not in communication with gaming device 14, and it may be capable of independently accepting wagers, conducting games, and awarding prizes to a player.

With continued reference to FIG. 1*a*, second display 100 may comprise a housing 102. Housing 102 may be arc-shaped and comprise a plurality of walls defining an internal space or cavity. Of course, housing 102 may be made in many different shapes. Housing 102 may have a window 103.

Second display 100 can have a gaming display device 104 mounted in housing 102. Display device 104 can have an organic light-emitting diode (OLED) display 110. OLED display 110 can display a matrix 120 of indicia 122 that are arranged in rows 124 and columns 126. Display device 104 may be visible through window 103.

Indicia 122 may represent various things, including prize amounts, multipliers, descriptions or representations of merchandise or services, progressive prizes, or jackpot prizes. In the embodiment shown in FIG. 1*a*, display device 104 is configured to present moving or scrolling indicia 122, which may move in various directions. As shown in FIG. 1*a*, indicia 122 may be scrolled or moved vertically. Of course, indicia 122 could be configured to move horizontally.

Figure 1B:
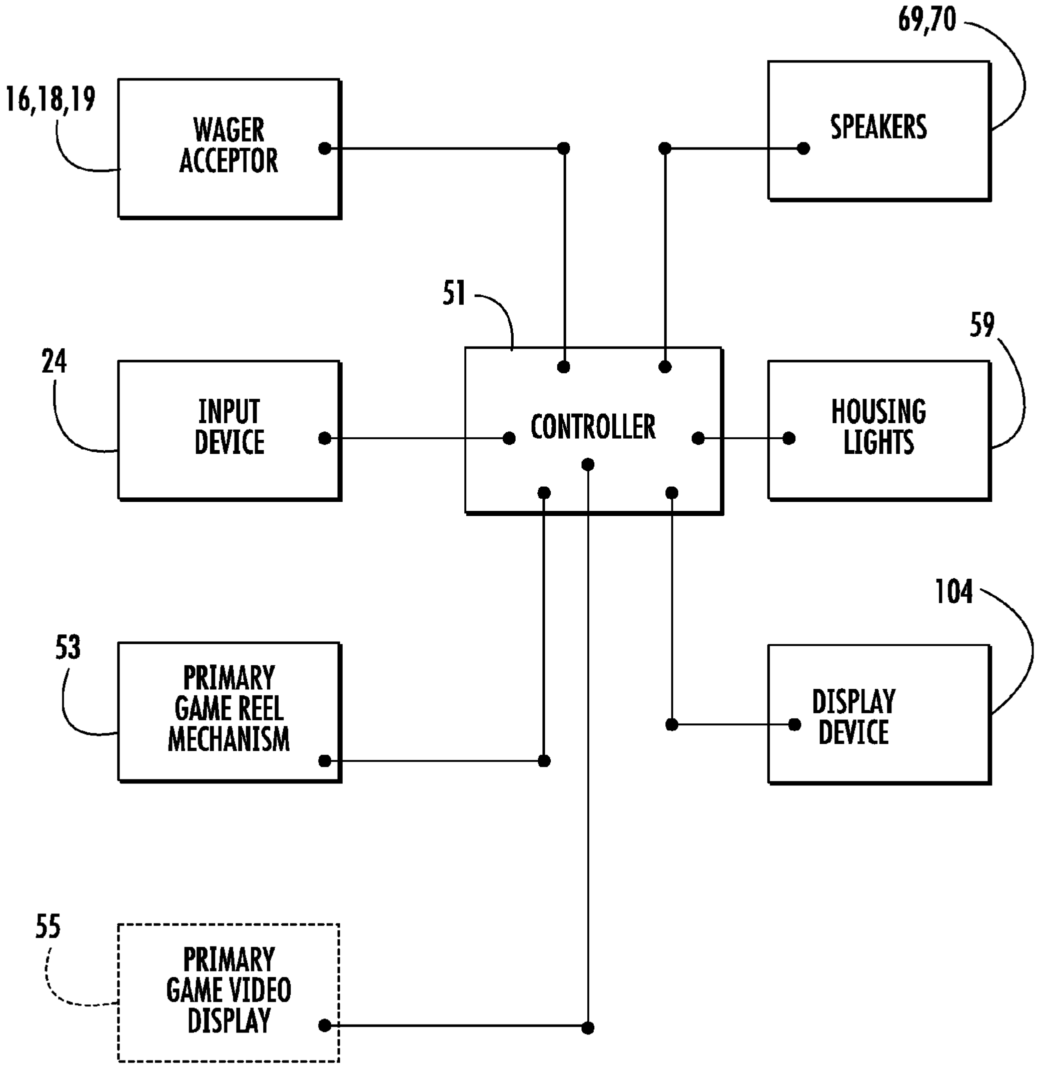
FIG. 1*b* is substantially a schematic diagram showing components of an embodiment of the gaming apparatus.

Referring now to FIG. 1*b*, a schematic diagram of some components that may be included in certain embodiments of gaming apparatus 10 (FIG. 1*a*) is shown. Gaming apparatus 10 may include a value or wager acceptor 16, 18, 19 configured to accept value from the player in the form of paper currency, coins, player cards, tickets, vouchers, tokens, or other forms of value. Value or wager acceptor 16, 18, 19 may be in communication with a controller 51. Controller 51 may be in communication with an input device 24. Controller 51 may detect insertion of value into value or wager acceptor 16, 18, 19 and may prompt the player to start a game by activating input device 24. Once controller 51 senses a signal to start the game, controller 51 may be configured to produce a random number and activate reel mechanism 53 of gaming device 14. Reel mechanism 53 may be configured to display indicia (including symbols, characters, numbers, letters, pictures, and the like) on game reels 30, 32, and 34 according to the random number generated by controller 51. Alternatively, controller 51 may be configured to produce a random number and activate video display 55 displaying images of game reels on gaming device 14. The video display of reels 55 may be configured to display indicia in video form according to the random number generated by controller 51. The primary game of gaming device 14, whether in physical form or in video form, is not limited to reel-type games, but may include card games, dominoes, roulette, craps, baccarat, and other games.

Gaming apparatus 10 may further include speakers 69 and 70, housing lights 59, and display device 104 in communication with controller 51. Controller 51 may store bonus event information and may have the ability to detect bonus events.

Upon an occurrence of a bonus event, controller 51 may activate speakers 69 and 70, housing lights 59, and display device 104, which causes indicia 122 to appear to move. Controller 51 may then cause OLED display 110 to highlight or point to one or more of the indicia 122 as a game outcome. Housing lights 59 and speakers 69 and 70 together may create a festive and lively winning atmosphere to elicit interest and entertainment from both the player and adjacent patrons.

In at least one embodiment, when gaming apparatus 10 is not in use, OLED display 110 may be activated by controller 51 in an attract mode. OLED display 110 may present a video or other presentation in order to attract game players to gaming apparatus 10. Controller 51 may activate display device 104 upon the occurrence of a bonus event.

Figure 2:
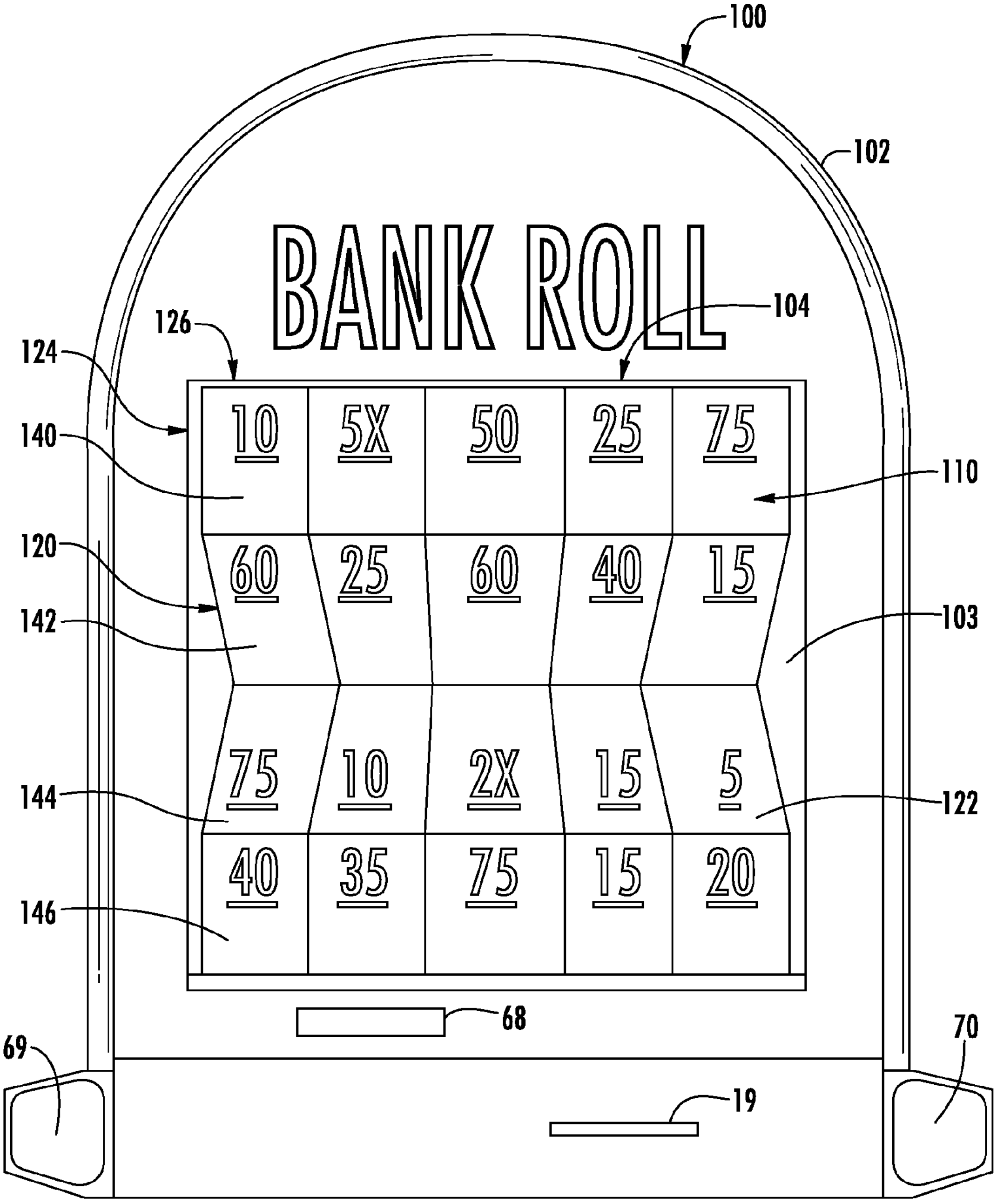
FIG. 2 is substantially an enlarged front elevation view of the second display of FIG. 1.
Figure 3:
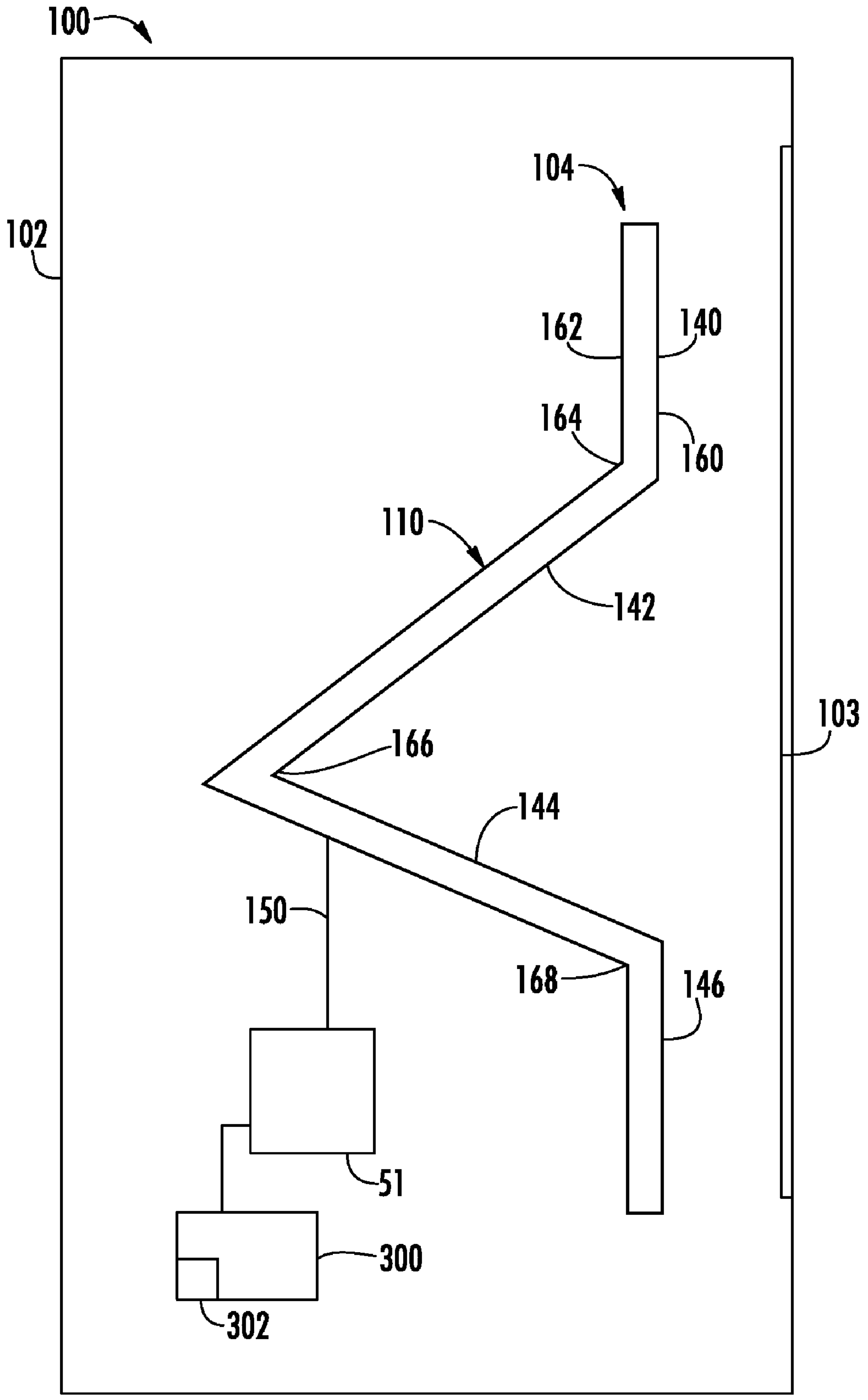
FIG. 3 is substantially a partial side cross-sectional view of the second display of FIG. 2.

Referring now to FIGS. 2 and 3, OLED display 110 can be formed to have several display surfaces 140, 142, 144, and 146. Since, OLED display 110 is flexible, it can be bent to form various shapes such as display surfaces 140, 142, 144, and 146. OLED display 110 can be in communication with controller 51. OLED display 110 may have a front side 160 and a back side 162. OLED display 110 can be bent in locations 164, 166, and 168 to form displays surfaces 140, 142, 144, and 146. Display surfaces 140, 142, 144, and 146 are not all aligned or linear. Display surfaces 140, 142, 144, and 146 are not all co-planar with each other.

An organic light-emitting diode display is a flexible full-color flat-panel display with a level of brightness, viewing angle, and sharpness that is not possible with traditional flat-panel displays. OLED displays are flexible, thin and light-weight making them well-suited for a variety of applications. OLED displays are commercially available.

Organic light-emitting diodes are self-luminous, have an unlimited viewing angle, have very high contrast, and have much higher speed responses. OLEDs have a distinct look that can attract attention to the gaming device. In addition, the OLED display can offer the gaming operator more choices of symbols to be displayed and more possible game outcomes.

One example of a gaming device using an OLED display is shown in U.S. Patent Publication Number 2004/0266515.

Electrical power and signal information is supplied to the OLED display 110 an electrical cable 150 (FIG. 3). The use of OLED display 110 provides additional excitement to the game. Controller 51 can present or display a wide variety of indicia 122 on OLED display 110. Controller 51 can selectively provide energization signals to a matrix of X and Y coordinates in OLED display 110 to create the desired image. Software in conjunction with known display controller technology is used to store a pattern of bits in a memory corresponding to the image to be displayed. One possible display may be a raster scan that selectively energizes the OLED display by rows and columns at a rapid rate.

OLED display 110 can be formed into many shapes including convex sections, concave sections, curved sections and flat sections. OLED display 110 can be bent into various angles and curves to form a wide variety of interesting and attractive shapes. In one embodiment, OLED display 110 can simulate a printing press, including a magazine printing press, a newspaper printing press, and a money printing press. OLED display 110 can simulate rollers (not shown) that can are used in conventional printing presses to support and guide moving paper.

In one embodiment, OLED display 110 can appear to display or simulate the image of a moving sheet of uncut paper currency, such as might be produced by the U.S. Treasury Department. Indicia 122 may appear to be currency bills having various values. Indicia 122 may indicate prizes such as an award of currency or credits, merchandise, services, game play, jackpots, and progressive prizes. Indicia 122 can be shown to or be scrolled along OLED display 110 such that an image of a moving band or belt is shown on OLED display 110.

With continued reference to FIGS. 2 and 3, an electronic controller 300 that utilizes a random number generator 302 may control gaming device 14 (FIG. 1*a*). Controller 300 can be in communication with controller 51. Random number generator 302 produces a random or pseudo random number for each game. The outcome of the game may be determined by comparing the random number produced by the random number generator to a table of outcomes stored in a memory and accessed by controller 300. A number of different tables of outcomes may be used and different tables may be used for different games. The tables can be designed so that different prizes have different probabilities of being awarded. Such design techniques are well known in gaming and are described above. Examples of such designs are shown in U.S. Pat. No. 4,448,419, issued to Telnaes, and U.S. Pat. No. 5,456,465, issued to Durham, which are hereby incorporated by reference. Controller 300 may cause gaming outcome display 28 (FIG. 1*a*), e.g., game reels 30, 32, and 34, to display an outcome that corresponds to the random number generated by random number generator 302. Of course, gaming device 14 may operate in many other ways and still achieve the objects of the present invention.

Gaming device 14 may also be capable, via controller 300 or other control mechanism (not shown), of producing a bonus-activating event. This event may be many different types of events. For example, a bonus-activating event may comprise a game outcome such as displaying a particular symbol, e.g., a "bonus" symbol, or combination of symbols, such as a "7" symbol on each of game reels 30, 32, and 34 (FIG. 1*a*). If the game being played is poker based, the bonus-activating event may be an occurrence of a certain hand, such as a royal flush. Furthermore, a bonus-activating event may occur when a player accumulates a number of symbols or game outcomes over a number of separate game plays. For example, a bonus-activating event may occur when the player receives three "bonus" symbols during a period of time. The bonus-activating event may be based on an external event. For example, a bonus-activating event may occur when a group of players obtain a certain result. Sensors (not shown) may be provided external to gaming device 14 to detect external bonus-activating events.

Bonus game controller 51 may further be provided to detect when a bonus activating event occurs in gaming device 14. Gaming device controller 300 may determine the outcome of each game, and when a bonus-activating outcome occurs, gaming device controller 300 may transmit a signal to bonus game controller 51. Alternatively, bonus game controller 51 may periodically interrogate gaming device controller 300. Bonus game controller 51 and gaming device controller 300 may be a single controller or separate controllers. In at least one embodiment, gaming device controller 300 is the GAM 2000 controller, available from Eagle Engineering of Pottstown, Pa.

The bonus prize may be determined by a random number generator (not shown) and a virtual pay table, such as the pay table described in U.S. Pat. No. 5,823,874 to Adams, which is hereby incorporated by reference. A simple pay table may also appear as follows:

TABLE 1

| Random Number | Amount Paid |
|---|---|
| 0.00 to 0.50 | $ 10.00 |
| 0.51 to 0.75 | $ 50.00 |
| 0.76 to 0.95 | X2 |
| 0.96 to 1.00 | $10,000.00 |

For example, if the random number generator produced 0.45 as the game outcome, the controller may cause OLED display 110 to indicate one of the indicia 122 representing ten dollars as the game outcome. Alternatively, if the random number generator produced a value of 0.85, the controller may cause OLED display 110 to indicate one of the indicia 122 representing a multiplier of 2. The controller may then cause bonus meter 68 (FIG. 1*a*) to display "10×2=20," (assuming a base prize of ten dollars), and $20.00 would be awarded to the player.

The bonus selection process may be repeated for a predetermined number of times to accumulate several bonus prizes that are added together to form the award to the game player. For example, the bonus game could be repeated three times to accumulate an award. The present invention is not limited to the example pay table shown. Furthermore, different kinds of bonus prizes may be awarded, such as progressive prizes, jackpot prizes, merchandise, services, prize multipliers, and additional games. Other effects may also be presented, such as pre-recorded sound from speakers 69 and 70 (FIG. 1*a*).

Speakers 69 and 70 may be configured to announce a prize that a player has won, play music during a prize winning event, announce features of the game offered by gaming apparatus 10, or play music to attract and entertain patrons. Additionally, a variety of graphics and lights, preferably designed according to a particular theme, are displayed on second display 100 (FIG. 1*a*). If the awarded bonus prize is money, the amount of the bonus prize may be added to the player's credit meter (not shown), may be dispensed to the player via a voucher or other cashless device, may be dispensed to coin receptacle 20 (FIG. 1*a*), or may be dispensed by an attendant that is summoned to award the prize to the player.

Figure 4:
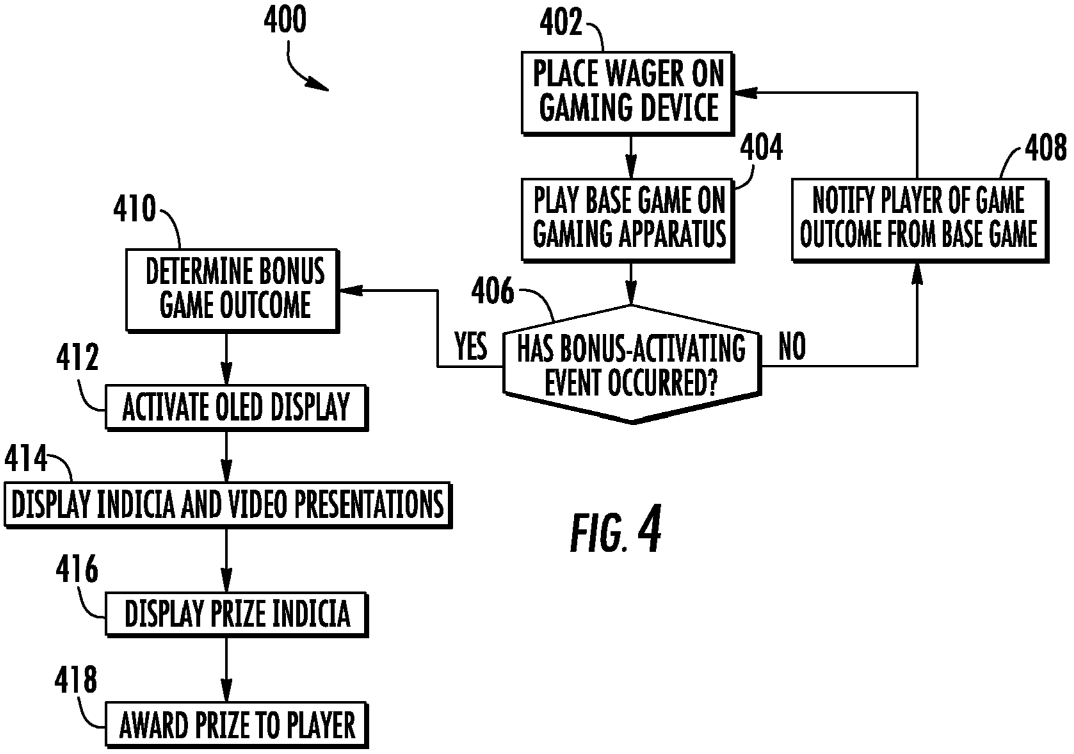
FIG. 4 is substantially a flowchart of a gaming method of the present invention.

One method of operation 400 of an embodiment of gaming apparatus 10 is illustrated in FIG. 4. In method 400, a player places a wager on a base gaming device 14 (FIG. 1*a*) at step 402. At step 404, the player plays a base game on the base gaming apparatus or gaming device 14. At decision 406, method 400 checks to see if the game outcome determined in step 404 is an outcome qualifying the player to play a bonus game. If not, method 400 proceeds to step 408 and notifies the player of the game outcome determined in step 404, and then returns to step 402.

If it is determined in step 406 that the game outcome of step 404 qualifies the player for a bonus game, method 400 proceeds to step 410. At step 410, the bonus game outcome is determined. At step 412, display device 104 is activated. This may include activation of OLED display 110. Other lights and sounds may also be activated to make the event more exciting to the player and those around the player, as well as to call attention to the device.

Method 400 then proceeds to step 414 where OLED display 110 displays indicia 122. Preferably, indicia 122 are caused to move or other types of video presentations are displayed on OLED display 110. At step 416, one of indicia 122 is displayed as a game outcome or prize indicia. Method 400 then awards any prizes indicated by OLED display 110 to the player in step 418. Of course many variations of this method can be made without departing from the scope of the present invention. For example, a moveable mechanical indicator could be used with OLED display 110 to indicate one of indicia 122 as the game outcome.

Alternative Embodiment

Figure 5:
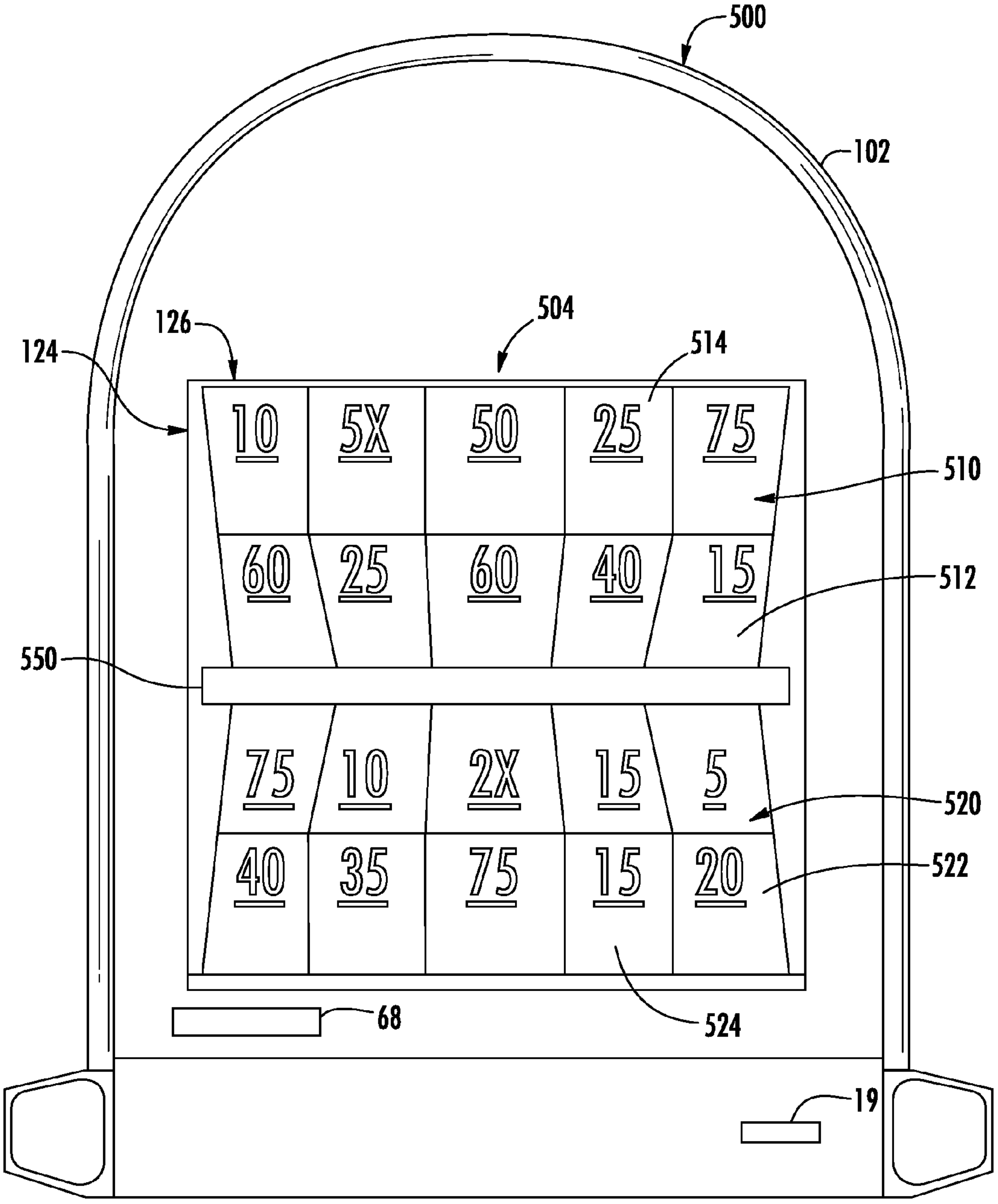
FIG. 5 is substantially a front elevation view of an alternative embodiment of a gaming apparatus of the present invention.
Figure 6:
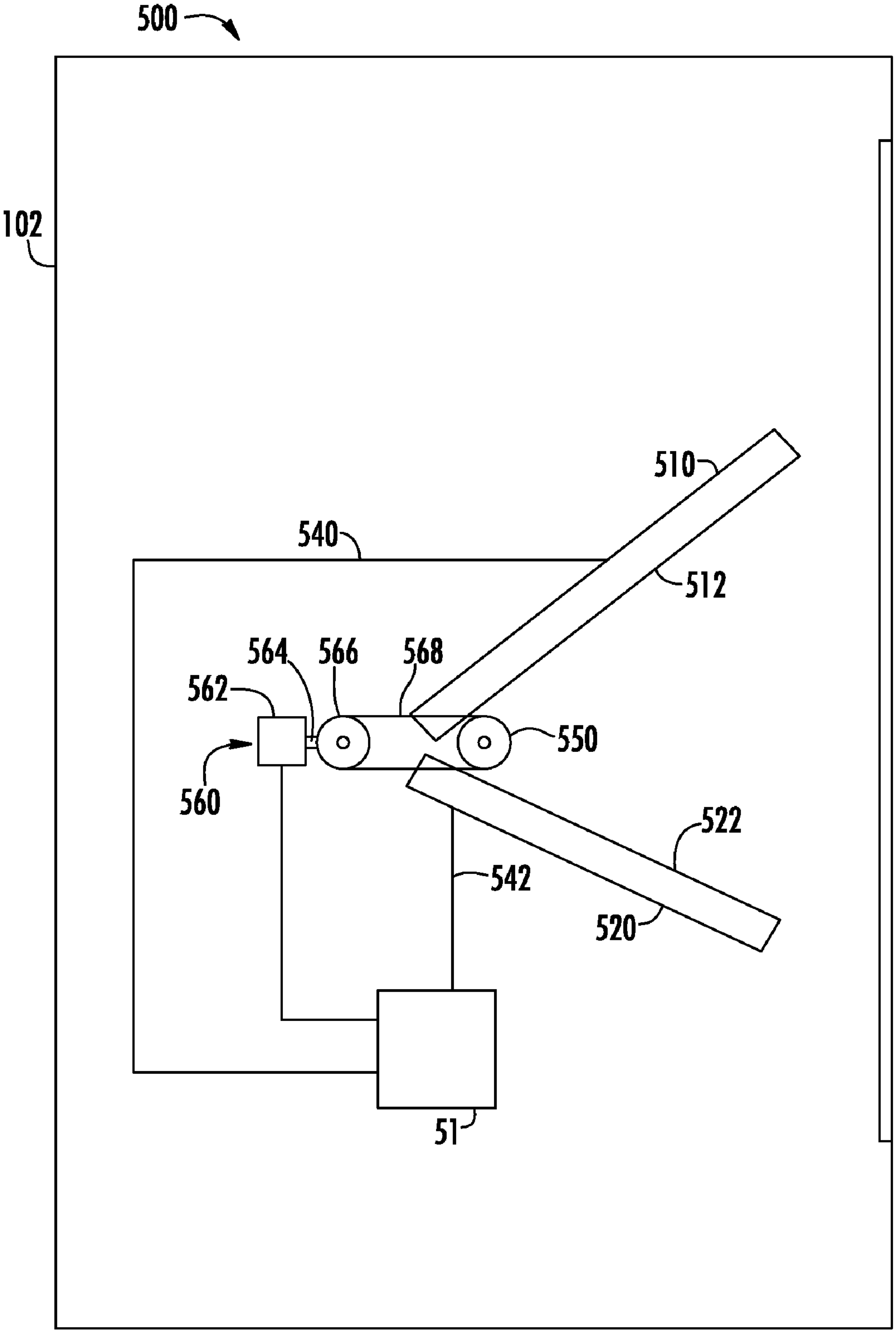
FIG. 6 is substantially a partial side cross-sectional view of the gaming apparatus of FIG. 5.

Referring now to FIGS. 5 and 6, an alternative embodiment of a second display of the present invention is shown. Second display 500 can be attached to gaming device 14 (FIG. 1*a*) and positioned on top of gaming device 14. Second display 500 can replace second display 100. Second display 500 can include a display device 504.

Second display 500 can include two displays 510 and 520. Displays 510 and 520 may be OLED displays or may be conventional video displays such as LCD or CRT displays. Displays 510 and 520 are arranged at an angle to each other. Display 510 has a display surface 512 and display 520 has a display surface 522. Displays 510 and 520 can be in communication with controller 51. Display 510 can display indicia 514 and display 520 can display indicia 524 that are arranged in rows 124 and columns 126. Electrical power and signal information is supplied to display 510 on an electrical cable 540 and to display 520 on cable 542.

Second display 500 can further include a moveable roller 550 positioned between displays 510 and 520. Roller 550 can hide the space or joint between displays 510 and 520. Roller 550 can be rotated by a positioning mechanism 560 in order to simulate the rotating roller of a printing press.

Positioning mechanism 560 can be mounted in housing 102. Positioning mechanism 560 includes an actuator 562 that is attached to a first wheel 566 by a shaft 564. A drive belt 568 preferably rotates around the first wheel 566 and drives roller 550. Actuator 562 may communicate with controller 51.

Controller 51 may control the video content shown on displays 510 and 520 and may control the rotation of roller 550.

Second display 500 can be operated with gaming device 14 in the same manner and method as previously described for gaming apparatus 10.

CONCLUSION

It can thus be realized that certain embodiments of the present invention provide a highly attractive and entertaining device for displaying prizes. Certain embodiments of the present invention further provide an organic light emitting diode display that is formed into a variety of shapes to indicate a bonus prize. Thus, certain embodiments of the present invention can easily catch patrons' attention and invite patrons to play the game. Certain embodiments may further cause players to play longer because the display device enhances the anticipation, stimulation, and excitement experienced by players.

Although the description above contains many specifications, these should not be construed as limiting the scope of the invention but as merely providing illustrations of some of the presently preferred embodiments of this invention. Thus, the scope of the invention should be determined by the appended claims and their legal equivalents rather than by the examples given.

What is claimed is:

1. A gaming apparatus comprising:

(A) a first organic light emitting diode display device having a first display surface, the first display surface being visible to a game player;

(B) a second organic light emitting diode display device having a second display surface, the second organic light emitting diode display device mounted adjacent the first organic light emitting diode display device, the second display surface being visible to the game player, wherein a joint is formed between the first organic light emitting diode display device and the second organic light emitting diode display device;

(C) a controller in communication with the first and second organic light emitting diode display devices, the controller configured to display at least one game outcome; and (D) a roller positioned between the first and second organic light emitting diode display devices, wherein the roller at least partially hides the joint from view of the player.

2. The gaming apparatus of claim 1, wherein the roller is rotated.

3. The gaming apparatus of claim 1, wherein the roller is coupled to an actuator.

4. The gaming apparatus of claim 3, wherein the actuator is in communication with the controller.

5. A gaming apparatus comprising:

(A) controller means for determining a game outcome;

(B) organic light emitting diode display device means for displaying the game outcome, the organic light emitting diode display device means in communication with the controller means, the organic light emitting diode display device means being bent into a plurality of different surfaces; and (C) roller means positioned adjacent the organic light emitting diode display device means for hiding a bend of the organic light emitting diode means;

wherein the controller means activates the roller to create a perception that the roller means is part of a display provided on the organic light emitting diode means.

6. The gaming apparatus of claim 5, wherein the organic light emitting diode display device means is bent in at least one location.

7. The gaming apparatus of claim 5, wherein the gaming apparatus conducts a bonus game.

8. A gaming apparatus comprising:

(A) an organic light emitting diode video display device having at least a first display surface, a second display surface and a first bent portion between the first and second display surfaces, at least one of the display surfaces being visible to a game player;

(B) a roller positioned between the game player and the bent portion of the organic light emitting diode video display device, wherein the roller at least partially obscures the bent portion from view of the game player; and (C) a controller in communication with the organic light emitting diode video display device, the controller being configured to:

(a) determine a game outcome;

(b) display a plurality of indicia on the organic light emitting diode video display;

(c) activate the roller; and (d) indicate at least one of the indicia as the game outcome.

9. The gaming apparatus of claim 8, wherein the organic light emitting diode video display device comprises a plurality of bent portions.

10. The gaming apparatus of claim 8, wherein the first display surface and the second display surface are not coplanar with each other.

* * * * *